(12) United States Patent  (10) Patent No.: US 8,315,566 B2
Aibara et al.                (45) Date of Patent:   Nov. 20, 2012

(54) WIRELESS COMMUNICATION SYSTEM FOR COMMUNICATION HANDOVER BY USING DIFFERENT COMMUNICATION MODES

(75) Inventors: Takehiro Aibara, Hamura (JP);
Kimiyasu Mizuno, Akishima (JP);
Hitoshi Amagai, Fussa (JP); Naotaka Uehara, Higashimurayama (JP);
Takayuki Kogane, Akishima (JP);
Sumito Shinohara, Akiruno (JP);
Masato Nunokawa, Fussa (JP); Tetsuya Handa, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 364 days.

(21) Appl. No.: 12/784,682

(22) Filed: May 21, 2010

(65) Prior Publication Data

US 2010/0311330 A1    Dec. 9, 2010

(30) Foreign Application Priority Data

Jun. 3, 2009  (JP) ................................. 2009-133685

(51) Int. Cl.
    *H04B 7/00* (2006.01)
(52) U.S. Cl. ...................... 455/41.2; 455/414.1; 455/436
(58) Field of Classification Search .................. 455/41.1,
    455/41.2, 67.11, 411, 414.1, 436, 456.1,
    455/550.1, 557, 558
    See application file for complete search history.

(56) References Cited

U.S. PATENT DOCUMENTS

2007/0141985 A1* 6/2007 Parkkinen et al. ............ 455/41.2
2008/0232299 A1* 9/2008 Mosig ............................ 370/328

FOREIGN PATENT DOCUMENTS

| JP | 2006-186418 A | 7/2006 |
| JP | 2006-318262 A | 11/2006 |
| JP | 2007-074598 A | 3/2007 |
| JP | 2007-097022 A | 4/2007 |
| JP | 2010-093430 A | 4/2010 |
| WO | WO 2005/081456 A1 | 9/2005 |

OTHER PUBLICATIONS

Japanese Office Action dated Apr. 26, 2011 (and English translation thereof) in counterpart Japanese Application No. 2009-133685.

* cited by examiner

*Primary Examiner* — Tuan H Nguyen
(74) *Attorney, Agent, or Firm* — Holtz, Holtz, Goodman & Chick, PC

(57) ABSTRACT

A wireless communication system includes a terminal device; a first wireless communication device; and a second wireless communication device. When the first wireless communication device communicates with the second wireless communication device by wireless LAN communication after a handover and completes prescribed processing to the second wireless communication device, the first wireless communication device sends first disconnection information to the second wireless communication device to disconnect the second wireless communication device. The second wireless communication device stores wireless LAN connection information before communicating with the first wireless communication device by the wireless LAN communication when the second wireless communication device is connected with the terminal device at a time of the handover. The second wireless communication device disconnects the first wireless communication device and connects with the terminal device based on the wireless LAN connection information when the first disconnection information is received.

9 Claims, 8 Drawing Sheets

WIRELESS COMMUNICATION SYSTEM FOR COMMUNICATION HANDOVER BY USING DIFFERENT COMMUNICATION MODES

CROSS-REFERENCE TO RELATED APPLICATIONS

This application is based upon and claims the benefit of priority from the prior Japanese Patent Application No. 2009-133685, filed on Jun. 3, 2009, and the entire contents thereof are incorporated herein by reference.

BACKGROUND OF THE INVENTION

1. Field of the Invention

This present invention relates to a wireless communication system for communication handover by using different communication modes.

2. Description of the Related Art

Currently, different communication modes are used depending on communication distances when wireless communications are performed between a wireless communication device (initiator) to send data and another wireless communication device (target) to receive the data. Consequently, technologies for sending and receiving data by changing communication modes depending on communication distances are disclosed. In particular, a handover technology attracts attention, the handover technology by which authentication is performed by a communication mode of short-range wireless communication using near field communication (NFC) or the like in wireless communication, and thereafter the wireless communication is transferred (handed over) to and performed by another communication mode.

For example, Japanese Patent Application Laid-Open Publication No. 2007-74598 discloses a communication system in which communication between a video camera and a remote commander is performed by NFC in order that the video camera obtains available protocol information (media code representing Bluetooth®) and communication information (BT address) of a television (TV) receiver from the remote commander, and communication between the video camera and the TV receiver is performed by a communications protocol of the available protocol information based on the communication information.

Japanese Patent Application Laid-Open Publication No. 2007-97022 discloses a communication system in which a hard disk (HD) recorder obtains a communication function list of a TV from the TV via a repeater by a NFC mode, the HD recorder sends a request of contents data of the TV to the TV by a communication mode other than the NFC mode based on the communication function list, and after authentication of the HD recorder, the TV sends the contents data to the HD recorder by the communication mode which is the same as the communication mode by which the contents data is requested.

However, for example, when a personal computer (PC) and a digital camera can perform wireless communication by both NFC and a wireless local area network (LAN), and the digital camera tries to be connected with the PC by the wireless LAN, to which communication therebetween is handed over from NFC, in order to transfer image data, there is a case that the PC which is being connected to Internet by the wireless LAN is disconnected from Internet and connected with the digital camera.

In such a case, however, it is not defined whether a state of the PC returns to its state at which the communication between the PC and the digital camera is not handed over from the NFC communication to the wireless LAN communication yet and the PC is connected to Internet when the image transfer from the digital camera to the PC is completed, the digital camera moves out of an area during the image transfer, the area within which the digital camera and the PC are connected by the wireless LAN communication, or the wireless LAN communication therebetween is ended due to occurrence of a jamming beam or noise.

As a result, it is troublesome, after communication between wireless communication devices is handed over from one communication mode to another (handover is performed), to return a state of the wireless communication device, to which data is transferred by performing the handover, to its state before the handover is performed, and hence a problem arises that usability of such a wireless communication device is not good.

BRIEF SUMMARY OF THE INVENTION

In view of the circumstances, an objective of the present invention is to provide a wireless communication device which hands over communication by using different communication modes.

To achieve at least one object mentioned above, an aspect of the present invention is a wireless communication system including: a terminal device on a network; a first wireless communication device on the network; and a second wireless communication device on the network, wherein the first wireless communication device including: a first wireless unit to perform wireless communication with one of the terminal device and the second wireless communication device; a second wireless unit to perform short-range wireless communication with the second wireless communication device; and a first control unit to send first disconnection information for disconnecting the second wireless communication device to the second wireless communication device via the first wireless unit, and to disconnect the second wireless communication device from the first wireless unit when communication with the second wireless communication device is handed over from the short-range wireless communication performed by the second wireless unit to the wireless communication performed by the first wireless unit and prescribed processing to the second wireless communication device is completed, and wherein the second wireless communication device including: a third wireless unit to perform wireless communication with one of the terminal device and the first wireless communication device; a fourth wireless unit to perform short-range wireless communication with the first wireless communication device; a storage unit to store connection information for connecting with the terminal device; and a second control unit to allow the fourth wireless unit to hand over communication with the first wireless communication device to the third wireless unit after allowing the storage unit to store the connection information for connecting with the terminal device with which the third wireless unit is connected when the communication with the first wireless communication device is handed over from the short-range wireless communication performed by the fourth wireless unit to the wireless communication performed by the third wireless unit and the third wireless unit is connected with the terminal device, and to disconnect the first wireless communication device from the third wireless unit and connect the third wireless unit with the terminal device based on the connection information stored in the storage unit when the third wireless unit receives the first disconnection information while performing the communication with the first wireless communication device by the wireless communication.

According to the present invention, a wireless communication device which hands over communication by using different communication modes can be provided, and consequently, the wireless communication devices can be smoothly connected.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention, and wherein.

DETAILED DESCRIPTION OF THE INVENTION

Hereinafter, embodiments of the present invention are described in detail referring to the drawings. The embodiments show the best modes of the present invention, and thus the embodiments and terms therein are not intended as a definition of the limits of the present invention.

First Embodiment

First, a configuration of a wireless communication system according to a first embodiment of the present invention is described.

Figure 1:
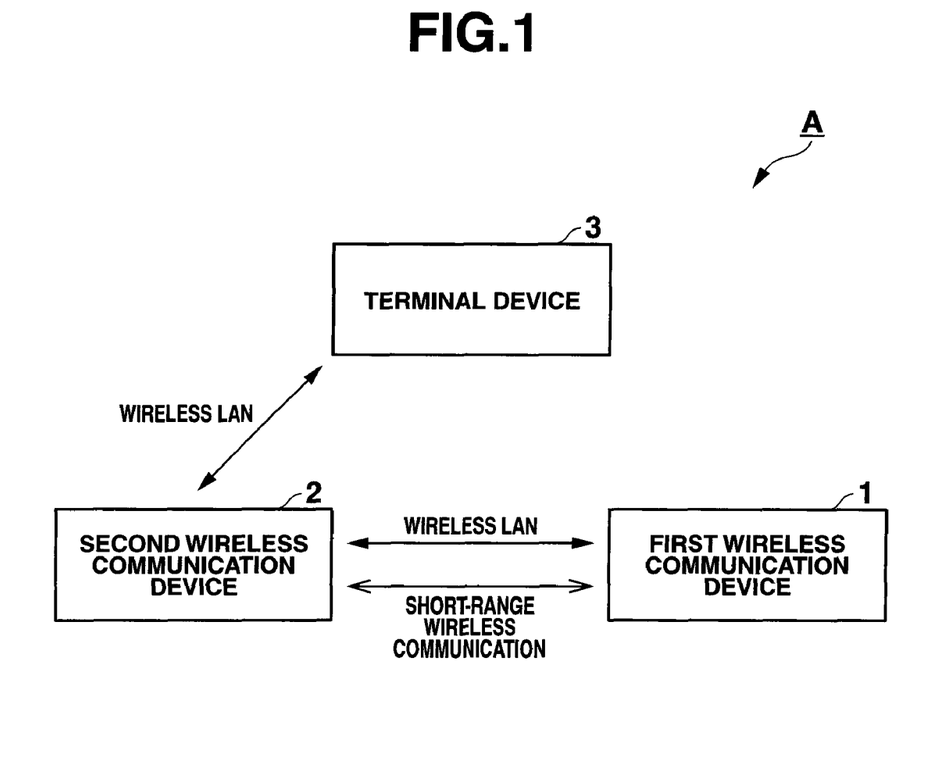
FIG. 1 is a schematic view showing a configuration of a wireless communication system.

FIG. 1 shows a schematic view of a wireless communication system A.

As shown in FIG. 1, the wireless communication system A includes a first wireless communication device 1, a second wireless communication device 2, and a terminal device 3. The first wireless communication device 1 and the second wireless communication device 2 may have the same configuration.

Both the first wireless communication device 1 and the second wireless communication device 2 in the embodiment of the present invention have a function to perform wireless communication by a communication mode of short-range wireless communication using near field communication (NFC) (hereinafter NFC communication) and by a communication mode of wireless local area network (LAN) communication using IEEE802.11 (hereinafter wireless LAN communication). Also, in the embodiment of the present invention, the terminal device 3 is a wireless access point existed on a network, and connected with the first wireless communication device 1 or the second wireless communication device 2 on a wireless LAN.

NFC is a communications protocol for proximity communication by electromagnetic induction using a single wireless frequency. For example, the ISM band of 13.56 MHz is the wireless frequency used for the NFC communication. In the NFC communication, a device to send data and a device to receive data are called an initiator and a target, respectively. In the first embodiment of the present invention, the first wireless communication device 1 and the second wireless communication device 2 are the initiator and the target, respectively.

Figure 2:
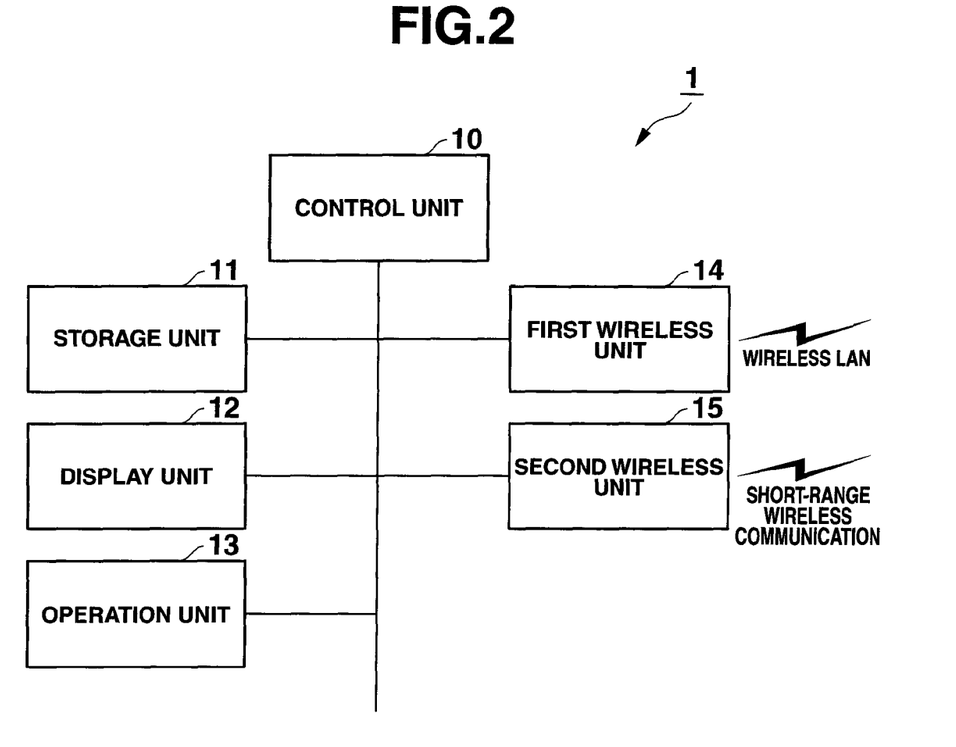
FIG. 2 is a schematic view showing a configuration of a first wireless communication device.

FIG. 2 shows a schematic view of the first wireless communication device 1.

As shown in FIG. 2, the first wireless communication device 1 includes a control unit 10, a storage unit 11, a display unit 12, an operation unit 13, a first wireless unit 14, and a second wireless unit 15. The units thereof are electrically connected with each other.

The control unit 10 includes a central processing unit (CPU), a read only memory (ROM), and a random access memory (RAM). The control unit 10 reads a specified program, table, and data from various programs, tables, data, and the like stored in the storage unit 11, expands the specified program, table, and data in a work area of the RAM or the storage unit 11, performs certain processing in cooperation with the specified program, and stores a result of the processing in a certain area of the RAM or the storage unit 11. The control unit 10 also controls operation of the first wireless communication device 1 comprehensively by instructing each unit of the first wireless communication device 1.

The control unit 10 reads a handover processing program stored in the storage unit 11 therefrom and data and the like required for the program from the ROM or the storage unit 11, and performs handover processing.

The handover processing is processing in which communication with the second wireless communication device 2 is performed by the second wireless unit 15 which performs the NFC communication, and then transferred (handed over) to the first wireless unit 14 which performs the wireless LAN communication.

The control unit 10 in the first embodiment functions as a first control unit in a case where prescribed processing to the second wireless communication device 2 is completed while the communication with the second wireless communication device 2 is being performed by the wireless LAN communication via the first wireless unit 14 after handed over from the NFC communication via the second wireless unit 15 in the handover processing. The first control unit sends first disconnection information to the second wireless communication device 2 from the first wireless unit 14, and disconnects the second wireless communication device 2 from the first wireless unit 14.

The first disconnection information includes information that the second wireless communication device 2 is to be disconnected. The prescribed processing in the first embodiment is data sending processing by which preset data to be sent to the second wireless communication device 2 is sent.

The control unit 10 disconnects the second wireless communication device 2 from the first wireless unit 14 when the prescribed processing to the second wireless communication device 2 is not completed and second disconnection information described below is received from the second wireless communication device 2.

Furthermore, in the handover processing, the control unit 10 allows the display unit 12 to display first disconnection notifying information described below when the second wireless communication device 2 is to be disconnected from the first wireless unit 14, and disconnects the second wireless communication device 2 from the first wireless unit 14 when a disconnection approving instruction described below is input from the operation unit 13.

The storage unit 11 is composed of a magneto-optic recording medium or an electrically erasable and rewritable nonvolatile memory such as a semiconductor, and fixed to the first wireless communication device 1 or removable therefrom. In the storage unit 11, various programs run by the control unit 10 and various tables, data, and the like used for the programs are stored beforehand.

The display unit 12 is composed of a liquid crystal display (LCD), an electro luminescence (EL) display, or the like, and displays various pieces of information in response to their respective signals input from the control unit 10.

The display unit 12 in the first embodiment functions as a first display unit to display a wireless LAN disconnecting screen according to an instruction from the control unit 10. On the wireless LAN disconnecting screen, the first disconnection notifying information which notifies that the second wireless communication device 2 is to be disconnected from the first wireless unit 14 is displayed.

The operation unit 13 includes a numeric keypad, various keys including a key for inputting a character, and a pointing device, and outputs key input information input from the numeric key pad or the various keys or information input from the pointing device as operation information to the control unit 10.

The operation unit 13 in the first embodiment functions as a first input unit to receive input of the disconnection approving instruction with which the second wireless communication device 2 is to be disconnected from the first wireless unit 14 is approved. The disconnection approving instruction is input by depressing a key linked to the disconnection approving instruction, the key such as an OK key on the wireless LAN disconnecting screen or one of the keys of the operation unit 13.

The first wireless unit 14 performs the wireless LAN communication using IEEE802.11 with the second wireless communication device 2 or the terminal device 3.

Figure 3:
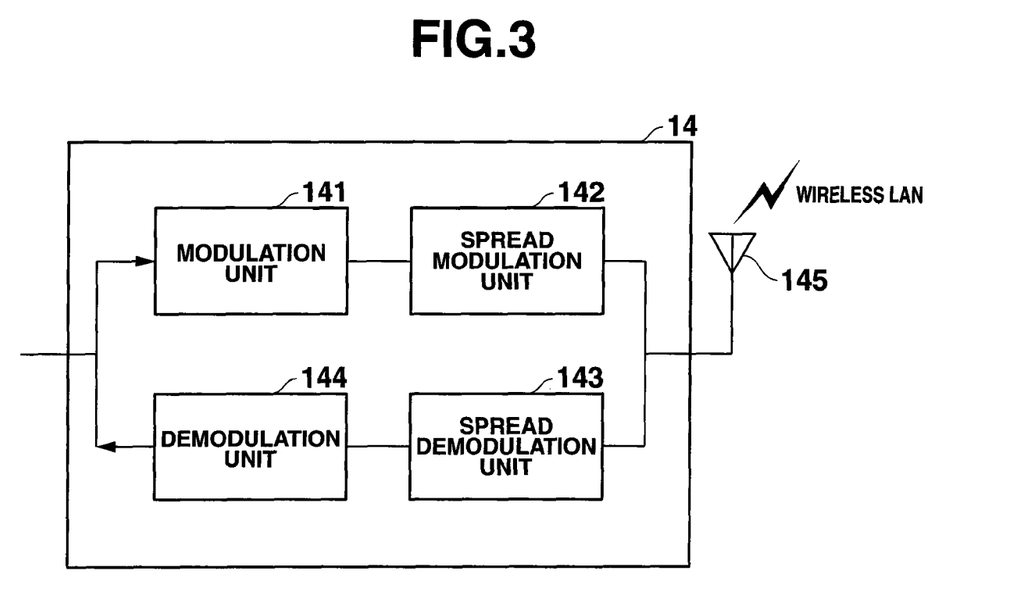
FIG. 3 is a block diagram of a first wireless unit.

FIG. 3 shows a configuration of the first wireless unit 14.

The first wireless unit 14 shown in FIG. 3 includes a modulation unit 141, a spread modulation unit 142, a spread demodulation unit 143, a demodulation unit 144, and an antenna 145.

The modulation unit 141 is a modulation circuit complying with IEEE802.11, and modulates a phase of data to be sent. The spread modulation unit 142 modulates a frequency of data to be sent by a spread modulation system complying with IEEE802.11 such as direct sequence spread spectrum (DSSS), orthogonal frequency division multiplexing (OFDM), or the like. The spread demodulation unit 143 demodulates a frequency of received data. The demodulation unit 144 is a demodulation circuit complying with IEEE802.11, and demodulates a phase of received data.

The second wireless unit 15 performs the NFC communication with the second wireless communication device 2.

Figure 4:
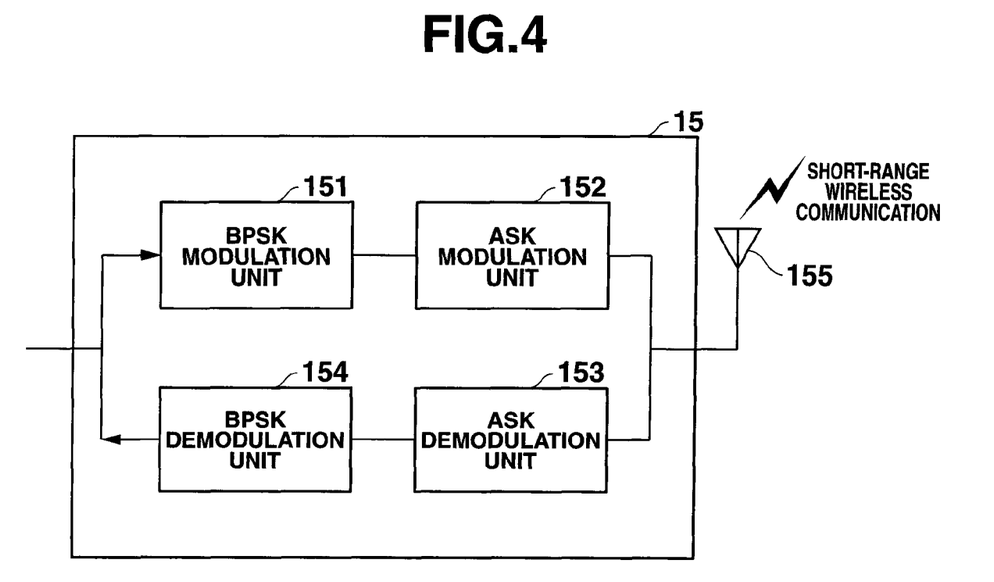
FIG. 4 is a block diagram of a second wireless unit.

FIG. 4 shows a configuration of the second wireless unit 15.

The second wireless unit 15 shown in FIG. 4 includes a binary phase shift keying (BPSK) modulation unit 151, an amplitude shift keying (ASK) modulation unit 152, an ASK demodulation unit 153, a BPSK demodulation unit 154, and an antenna 155.

The BPSK modulation unit 151 modulates a phase of data to be sent. The ASK modulation unit 152 modulates amplitude of data to be sent. The ASK demodulation unit 153 demodulates amplitude of received data. The BPSK demodulation unit 154 demodulates a phase of received data.

The modulation system is not limited to the above-mentioned systems, and other systems for modulation can be used, instead.

Figure 5:
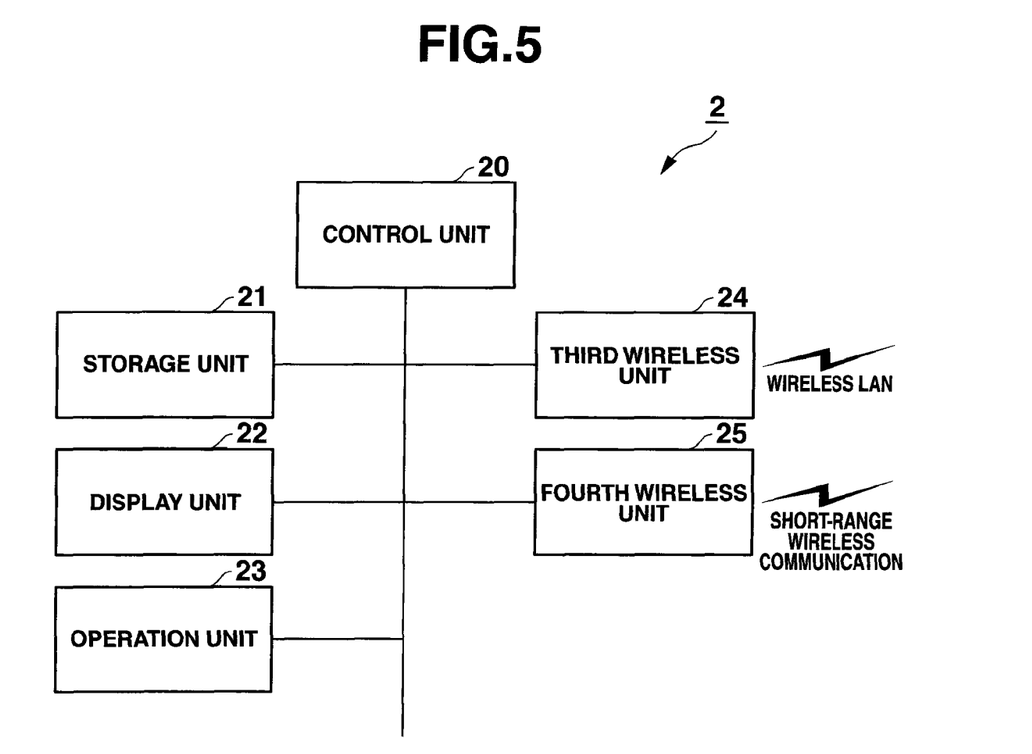
FIG. 5 is a schematic view showing a configuration of a second wireless communication device.

FIG. 5 shows a schematic view of the second wireless communication device 2.

As shown in FIG. 5, the second wireless communication device 2 includes a control unit 20, a storage unit 21, a display unit 22, an operation unit 23, a third wireless unit 24, and a fourth wireless unit 25. The units thereof are electrically connected with each other.

The second wireless communication device 2 has a configuration similar to that of the first wireless communication device 1, and hence only the difference therefrom is described.

In order to distinguish between the first wireless communication device 1 and the second wireless communication device 2, different numerals are given to units of the second wireless communication device 2 from those given to the units of the first wireless communication device 1.

Configurations of the third wireless unit 24 and the fourth wireless unit 25 are the same as those of the first wireless unit 14 and the second wireless unit 15 of the first wireless communication device 1, respectively, and hence illustration and description thereof are omitted.

The control unit 20 reads a handover processing program stored in the storage unit 21 therefrom and data and the like required for the program from a ROM or the storage unit 21, and performs handover processing. The handover processing is processing in which communication with the first wireless communication device 1 is performed by the fourth wireless unit 25 which performs the NFC communication, and then transferred (handed over) to the third wireless unit 24 which performs the wireless LAN communication.

The control unit 20 in the first embodiment allows the storage unit 21 to store connection information (wireless LAN connection information) for connecting with the terminal device 3 by the wireless LAN communication, and thereafter allows the fourth wireless unit 25 to hand over the communication with the first wireless communication device 1 to the third wireless unit 24 in a case where the third wireless unit 24 is connected with the terminal device 3 by the wireless LAN communication when the handover processing is performed. The control unit 20 functions as a second control unit in a case where the third wireless unit 24 receives the first disconnection information from the first wireless communication device 1 while the third wireless unit 24 performs the wireless LAN communication with the first wireless communication device 1 in the handover processing. The second control unit disconnects the first wireless communication device 1 from the third wireless unit 24, and connects the third wireless unit 24 with the terminal device 3 based on the connection information stored in the storage unit 21.

Furthermore, the control unit 20 sends the second disconnection information that the first wireless communication device 1 is disconnected to the first wireless communication device 1 when the third wireless unit 24 does not receive the first disconnection information from the first wireless communication device 1, and a problem (communication error) occurs to the communication with the first wireless communication device 1.

As the communication error, either a case where the NFC communication is ended or a case where the wireless LAN communication is ended is preset.

When the case where the NFC communication is ended is preset as the communication error, and the communication with the first wireless communication device 1 is handed over from the fourth wireless unit 25 to the third wireless unit 24, the control unit 20 allows the forth wireless unit 25 to keep the NFC communication with the first wireless communication device 1. Then, the control unit 20 determines that the communication error occurs when the NFC communication with the first wireless communication device 1 by the forth wireless unit 25 is ended.

When the case where the wireless LAN communication is ended is preset as the communication error, the control unit 20 determines that the communication error occurs when the wireless LAN communication with the first wireless communication device 1 by the third wireless unit 24 is ended.

The display unit 22 in the first embodiment functions as a second display unit to display a wireless LAN disconnected screen according to an instruction from the control unit 20. On the wireless LAN disconnected screen, second disconnection notifying information which notifies that the first wireless communication device 1 is disconnected from the third wireless unit 24 is displayed.

The operation unit 23 in the first embodiment functions as a second operation unit to receive input of a disconnection confirming instruction with which that the first wireless communication device 1 is disconnected from the third wireless unit 24 is confirmed by a user. The disconnection confirming instruction is input by depressing a key linked to the disconnection confirming instruction, the key such as an OK key on the wireless LAN disconnected screen or one of keys of the operation unit 23.

Figure 6:
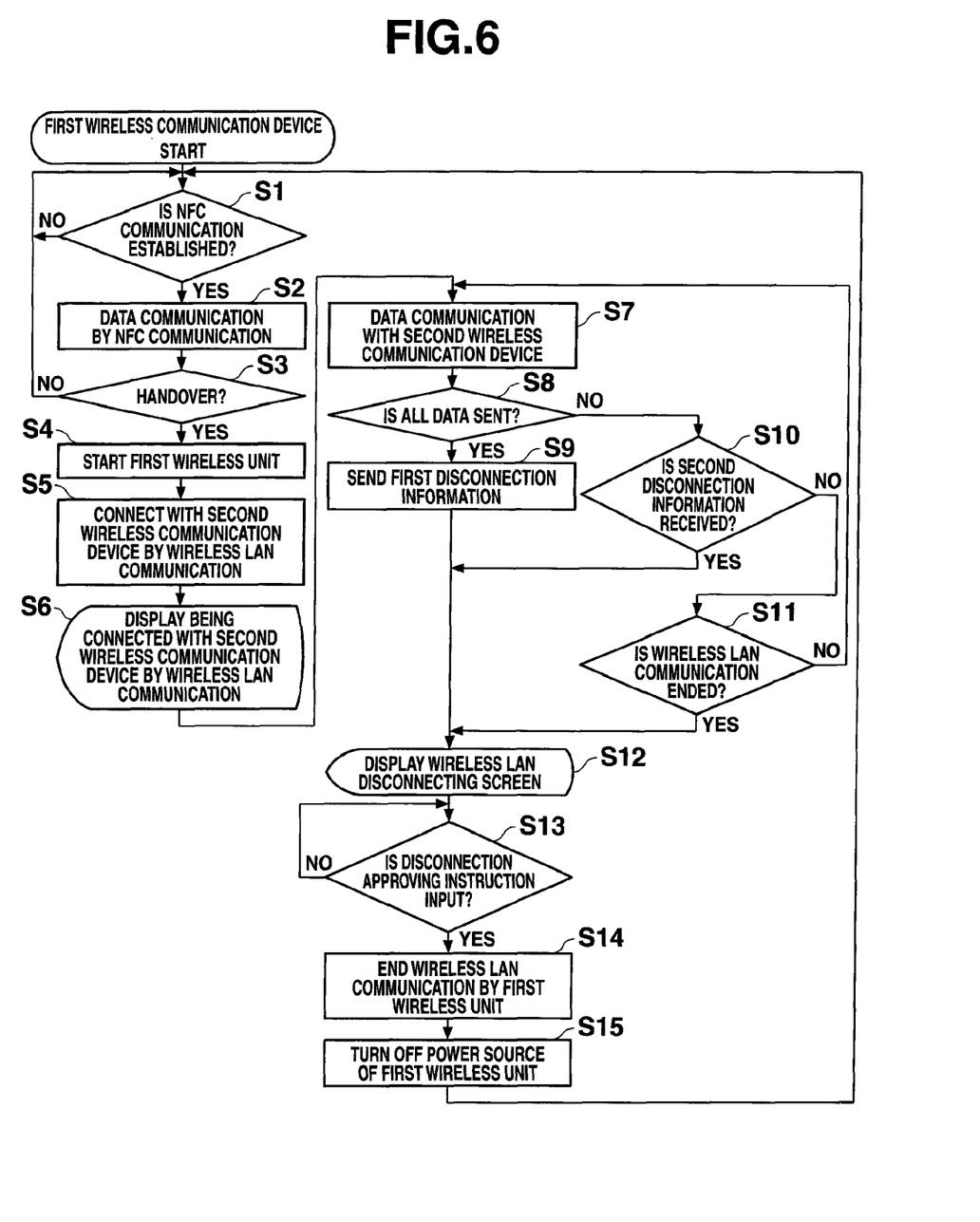
FIG. 6 is a flow chart of handover processing performed in the first wireless communication device according to a first embodiment of the present invention.
Figure 7:
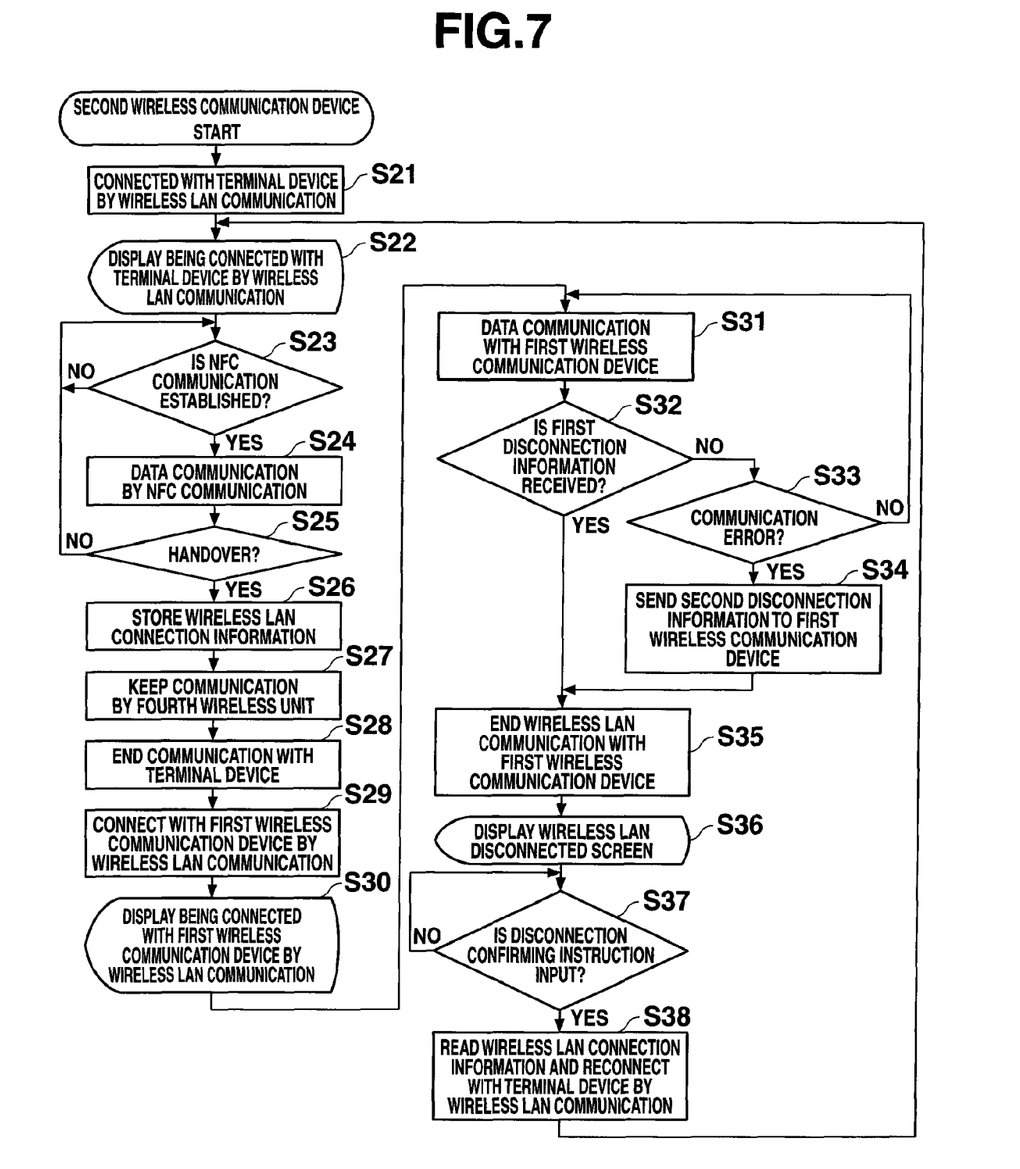
FIG. 7 is a flow chart of handover processing performed in the second wireless communication device according to the first embodiment of the present invention.

Next, operation of the wireless communication system A according to the first embodiment is described referring to FIGS. 6 and 7.

As an initial state of the handover processing shown in FIGS. 6 and 7, the second wireless communication device 2 is connected with the terminal device 3 via the third wireless unit 24 by the wireless LAN communication, and accordingly the second wireless communication device 2 is on a network where the terminal device 3 is.

FIG. 6 shows a flow chart of the handover processing performed in the first wireless communication device 1 according to the first embodiment of the present invention. The handover processing shown in FIG. 6 is performed by the control unit 10 and the other units of the first wireless communication device 1 working together.

The control unit 10 determines whether the NFC communication is established or not (Step S1). At Step S1, the first wireless communication device 1 approaches the second wireless communication device 2, and whether response data to polling data sent from the second wireless unit 15 of the first wireless communication device 1 is received by the second wireless unit 15 or not is determined.

When the NFC communication is not established (Step S1; NO), the control unit 10 repeats Step S1. When the NFC communication is established (Step S1; YES), the control unit 10 allows the second wireless unit 15 to establish the NFC communication so as to perform data communication with the second wireless communication device 2 (Step S2).

The control unit 10 determines whether the communication with the second wireless communication device 2 is handed over from the second wireless unit 15 to the first wireless unit 14 (handover is performed) or not based on a result of an analysis of the data communication performed at Step S2 (Step S3). When the handover is not performed (Step S3; NO), the control unit 10 returns to Step S1.

When the handover is performed (Step S3; YES), the control unit 10 turns on a power source of the first wireless unit 14 to start the first wireless unit 14 (Step S4), connects the first wireless unit 14 with the second wireless communication device 2 by the wireless LAN communication (Step S5), and displays on the display unit 12 that the second wireless communication device 2 is connected by the wireless LAN communication (Step S6).

The control unit 10 allows the first wireless unit 14 to perform the data communication with the second wireless communication device 2 by the wireless LAN communication (Step S7).

The control unit 10 determines whether all the data to be sent to the second wireless communication device 2 is sent or not (Step S8). When all the data is sent to the second wireless communication device 2 (Step S8; YES), the control unit 10 sends the first disconnection information to the second wireless communication device 2 from the first wireless unit 14 by the wireless LAN communication (Step S9).

When all the data is not sent to the second wireless communication device 2 (Step S8; NO), the control unit 10 determines whether the second disconnection information is received via the first wireless unit 14 or the second wireless unit 15 or not (Step S10). When the second disconnection information is received (Step S10; YES), the control unit 10 goes to Step S12.

When the second disconnection information is not received (Step S10; NO), the control unit 10 determines whether the wireless LAN communication with the second wireless communication device 2 by the first wireless unit 14 is ended or not (Step S11). When the wireless LAN communication with the second wireless communication device 2 by the first wireless unit 14 is ended (Step S11; YES), the control unit 10 goes to Step S12. When the wireless LAN communication with the second wireless communication device 2 by the first wireless unit 14 is not ended (Step S11; NO), the control unit 10 returns to Step S7.

After Step S9, YES at Step S10, or YES at Step S11, the control unit 10 displays the wireless LAN disconnecting screen on the display unit 12 (Step S12), and determines whether the disconnection approving instruction is input from the operation unit 13 or not (Step S13).

When the disconnection approving instruction is not input (Step S13; NO), the control unit 10 repeats Step S13. When the disconnection approving instruction is input (Step S13; YES), the control unit 10 disconnects the second wireless communication device 2 from the first wireless unit 14 so as to end the wireless LAN communication (Step S14), stops the first wireless unit 14 and turns off the power source thereof (Step S15), and then returns to Step S1.

FIG. 7 shows a flow chart of the handover processing performed in the second wireless communication device 2 according to the first embodiment of the present invention. The handover processing shown in FIG. 7 is performed by the control unit 20 and the other units of the second wireless communication device 2 working together.

Since the second wireless communication device 2 is connected with the terminal device 3 via the third wireless unit 24 by the wireless LAN communication (Step S21), the control unit 20 displays on the display unit 22 that the second wireless communication device 2 is connected with the terminal device 3 by the wireless LAN communication (Step S22).

The control unit 20 determines whether the NFC communication is established or not (Step S23). At Step S23, the first wireless communication device 1 approaches the second wireless communication device 2, and whether the polling data sent from the second wireless unit 15 of the first wireless communication device 1 is received by the forth wireless unit 25 of the second wireless communication device 2 or not is determined.

When the NFC communication is not established (Step S23; NO), the control unit 20 repeats Step S23. When the NFC communication is established (Step S23; YES), the control unit 20 allows the forth wireless unit 25 to establish the NFC communication so as to perform data communication with the first wireless communication device 1 (Step S24).

At Step S24, for example, when the forth wireless unit 25 receives the polling data (Step S23; YES), the response data to the polling data is sent from the forth wireless unit 25 to the first wireless communication device 1. Then, the NFC communication is established between the first wireless communication device 1 and the second wireless communication device 2 after two-way authentication and the like, and accordingly the first wireless communication device 1 and the second wireless communication device 2 have the data communication.

The control unit 20 determines whether the communication with the first wireless communication device 1 is handed over from the fourth wireless unit 25 to the third wireless unit 24 (handover is performed) or not based on a result of an analysis of the data communication performed at Step S24 (Step S25). When the handover is not performed (Step S25; NO), the control unit 20 returns to Step S23.

When the handover is performed (Step S25; YES), the control unit 20 stores the wireless LAN connection information in the storage unit 21 (Step S26). The wireless LAN connection information includes an address, an account, and a communications protocol of the terminal device 3 with which the second wireless communication device 2 is connected via the third wireless unit 24.

The control unit 20 allows the fourth wireless unit 25 to keep the NFC communication with the first wireless communication device 1 (Step S27). At Step S27 and thereafter, the control unit 20 regularly polls the first wireless communication device 1, and determines whether the polling is responded or not.

The control unit 20 allows the third wireless unit 24 to disconnect the terminal device 3 from the third wireless unit 24 so as to end the wireless LAN communication with the terminal device 3 (Step S28).

The control unit 20 connects the third wireless unit 24 with the first wireless communication device 1 by the wireless LAN communication (Step S29), displays on the display unit 22 that the first wireless communication device 1 is connected by the wireless LAN communication (Step S30), and allows the third wireless unit 24 to perform the data communication with the first wireless communication device 1 (Step S31).

The control unit 20 determines whether the first disconnection information is received via the third wireless unit 24 or not (Step S32). When the first disconnection information is received (Step S32; YES), the control unit 20 goes to Step S35.

When the first disconnection information is not received (Step S32; NO), the control unit 20 determines whether a communication error occurs or not (Step S33). Either a case where the NFC communication is ended or a case where the wireless LAN communication is ended is preset as a condition for Step S33, and whether the preset condition is met or not is determined at Step S33.

For example, when the case where the NFC communication is ended is set as the condition, the control unit 20 determines at Step S33 whether the NFC communication with the first wireless communication device 1 by the fourth wireless unit 25 is ended (polling is not responded) or not.

On the other hand, when the case where the wireless LAN communication is ended is set as the condition, the control unit 20 determines at Step S33 whether the wireless LAN communication with the first wireless communication device 1 by the third wireless unit 24 is ended or not.

When the communication error does not occur (Step S33; NO), the control unit 20 returns to Step 31. When the communication error occurs (Step S33; YES), the control unit 20 sends the second disconnection information from the third wireless unit 24 or the fourth wireless unit 25 to the first wireless communication device 1 (Step S34).

After YES at Step S32 or after Step S34, the control unit 20 allows the third wireless unit 24 to disconnect the first wireless communication device 1 from the third wireless unit 24 so as to end the wireless LAN communication with the first wireless communication device 1 (Step S35).

The control unit 20 displays the wireless LAN disconnected screen on the display unit 22 (Step S 36), and determines whether the disconnection confirming instruction is input from the operation unit 23 or not (Step S37).

When the disconnection confirming instruction is not input (Step S37; NO), the control unit 20 repeats Step S37. When the disconnection confirming instruction is input (Step S37; YES), the control unit 20 reads the wireless LAN connection information from the storage unit 21, and reconnects the third wireless unit 24 with the terminal device 3 by the wireless LAN communication (Step S38), and then returns to Step S22.

As described above, by the wireless communication system A according to the first embodiment of the present invention, in a case where the communication between the first wireless communication device 1 and the second wireless communication device 2 is handed over (handover is performed) from the NFC communication to the wireless LAN communication, and the second wireless communication device 2 communicates with the terminal device 3 by the wireless LAN communication, the second wireless communication device 2 is reconnected with the terminal device 3 after the handover is performed in both the first wireless communication device 1 and the second wireless communication device 2 and the first wireless communication device 1 completes the prescribed processing to the second wireless communication device 2.

Therefore, after the handover is performed, a state of the second wireless communication device 2 can be returned to its state before the handover is performed without giving a user trouble, and accordingly usability thereof can be improved.

Namely, operability of the wireless communication device which performs the handover can be improved.

By the wireless communication system A according to the first embodiment of the present invention, the second wireless communication device 2 can be reconnected with the terminal device 3 after the data sending processing, by which the preset data to be sent from the first wireless communication device 1 to the second wireless communication device 2 is sent, is completed.

Furthermore, in a case where the problem (communication error) occurs to the communication between the first wireless communication device 1 and the second wireless communication device 2, even when the first wireless communication device 1 does not complete the prescribed processing to the second wireless communication device 2 yet, the first wireless communication device 1 and the second wireless communication device 2 can be disconnected from each other, and the second wireless communication device 2 can be reconnected with the terminal device 3.

As the case where the communication error occurs, the case where the NFC communication between the first wireless communication device 1 and the second wireless communication device 2 is ended can be used. That is, for example, the case where the first wireless communication device 1 and/or the second wireless communication device 2 moves out from their NFC communication area can be set as the communication error.

Also, as the case where the communication error occurs, the case where the wireless LAN communication between the first wireless communication device 1 and the second wireless communication device 2 is ended can be used. That is, for example, the case where the wireless LAN communication between the first wireless communication device 1 and the second wireless communication device 2 is ended due to occurrence of a jamming beam and/or noise on their communication paths of the wireless LAN can be set as the communication error.

Moreover, in a case where an approval for disconnecting the second wireless communication device 2 is obtained in the first wireless communication device 1 when the second wireless communication device 2 is to be disconnected from the first wireless communication device 1, the first wireless communication device 1 can disconnect the second wireless communication device 2.

Also, in a case where a user confirms in the second wireless communication device 2 that the wireless LAN communication with the first wireless communication device 1 is ended, and accordingly the first wireless communication device 1 is disconnected when the first wireless communication device 1 is disconnected from the second wireless communication device 2, the second wireless communication device 2 can be reconnected with the terminal device 3.

Second Embodiment

First, a configuration of the wireless communication system A according to a second embodiment of the present invention is described.

A schematic configuration of the wireless communication system A according to the second embodiment is the same as that of the wireless communication system A according to the first embodiment shown in FIG. 1, and hence illustration and description thereof are omitted.

A schematic configuration of the first wireless communication device 1 according to the second embodiment is similar to that of the first wireless communication device 1 according to the first embodiment, and hence illustration thereof is omitted, and only the difference therefrom is described.

The control unit 10 in the second embodiment performs handover processing which is similar to that performed by the control unit 10 in the first embodiment. In the handover processing in the second embodiment, the control unit 10 starts measuring a first connection available time when the first wireless unit 14 receives the first connection available time from the second wireless communication device 2. When the first wireless unit 14 performs the wireless LAN communication with the second wireless communication device 2, and the first connection available time is over, the control unit 10 determines that the prescribed processing is completed. Then, the control unit 10 sends the first disconnection information to the second wireless communication device 2 from the first wireless unit 14 so as to disconnect the second wireless communication device 2 from the first wireless unit 14.

A schematic configuration of the second wireless communication device 2 according to the second embodiment is similar to that of the second wireless communication device 2 according to the first embodiment, and hence illustration thereof is omitted, and only the difference therefrom is described.

The control unit 20 in the second embodiment performs handover processing which is similar to that performed by the control unit 20 in the first embodiment. In the handover processing in the second embodiment, the control unit 20 sends the first connection available time from the third wireless unit 24 to the first wireless communication device 1 after handing over the communication with the first wireless communication device 1 from the fourth wireless unit 25 to the third wireless unit 24.

The first connection available time is a preset time during which the third wireless unit 24 can perform the wireless LAN communication with the first wireless communication device 1, and stored in the storage unit 21 beforehand.

The first disconnection information in the second embodiment is received when the data sending processing, by which the preset data to be sent from the first wireless communication device 1 to the second wireless communication device 2 is sent, is completed or the first connection available time is over.

Figure 8:
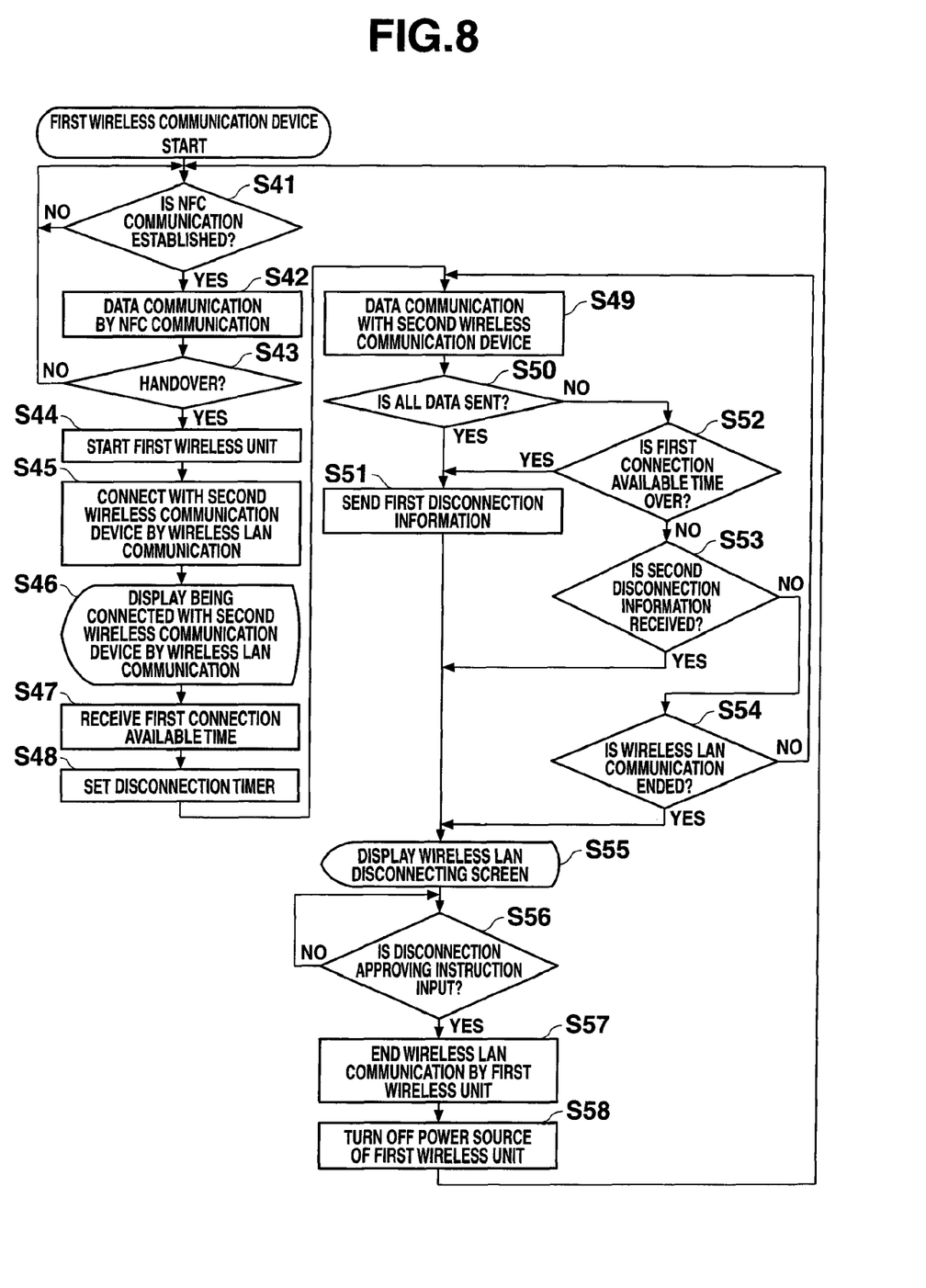
FIG. 8 is a flow chart of handover processing performed in the first wireless communication device according to a second embodiment of the present invention.
Figure 9:
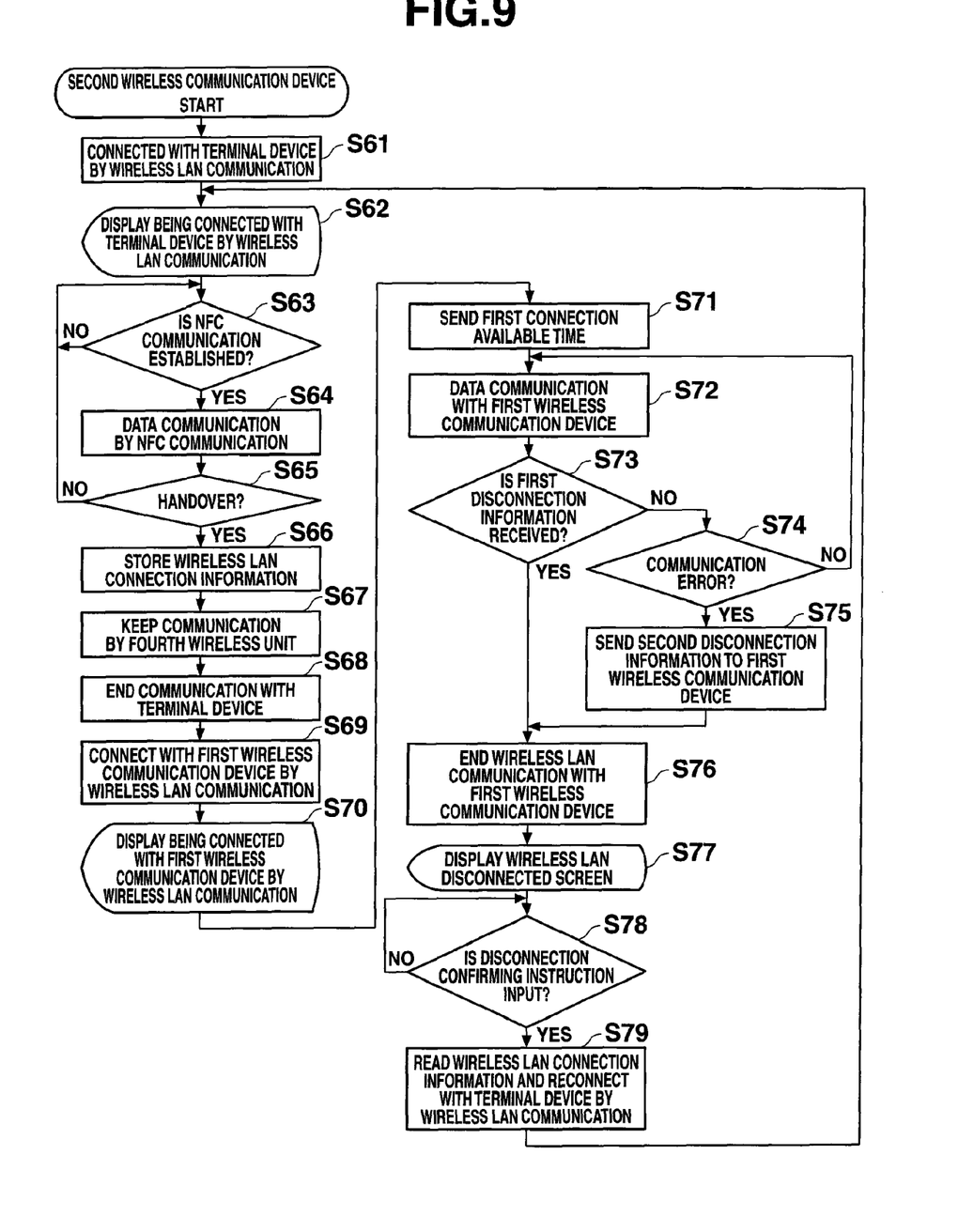
FIG. 9 is a flow chart of handover processing performed in the second wireless communication device according to the second embodiment of the present invention.

Next, operation of the wireless communication system A according to the second embodiment is described referring to FIGS. 8 and 9.

As an initial state of the handover processing shown in FIGS. 6 and 7, the second wireless communication device 2 is connected with the terminal device 3 via the third wireless unit 24 by the wireless LAN communication, and accordingly the second wireless communication device 2 is on a network where the terminal device 3 is.

FIG. 8 shows a flow chart of the handover processing performed in the first wireless communication device 1 according to the second embodiment of the present invention. The handover processing shown in FIG. 8 is performed by the control unit 10 and the other units of the first wireless communication device 1 working together.

Steps S41-S46 are the same as Steps S1-S6 in the first embodiment shown in FIG. 6, and hence description thereof is omitted.

When the first wireless unit 14 receives the first connection available time from the second wireless communication device 2 (Step S47), the control unit 10 sets the first connection available time to a disconnection timer provided in the control unit 10, and starts measuring the first connection available time (starts the disconnection timer) (Step S48).

The control unit 10 allows the first wireless unit 14 to perform the data communication with the second wireless communication device 2 by the wireless LAN communication (Step S49).

The control unit 10 determines whether all the data to be sent to the second wireless communication device 2 is sent or not (Step S50). When all the data is sent to the second wireless communication device 2 (Step S50; YES), the control unit 10 sends the first disconnection information from the first wireless unit 14 to the second wireless communication device 2 by the wireless LAN communication (Step S51).

When all the data is not sent to the second wireless communication device 2 (Step S50; NO), the control unit 10 determines whether the measured time by the disconnection timer exceeds the first connection available time or not (Step S52). When the first connection available time is exceeded by the measured time (Step S52; YES), the control unit 10 goes to Step S51.

That is, the first disconnection information in the second embodiment is sent when all the data is sent to the second wireless communication device 2 (Step S50; YES) or when the first connection available time is exceeded by the measured time (Step S52; YES).

When the first connection available time is not exceeded by the measured time (Step S52; NO), the control unit 10 goes to Step S53. Steps S53-S58 are the same as Steps S10-S15 in the first embodiment shown in FIG. 6, and hence description thereof is omitted.

FIG. 9 shows a flow chart of the handover processing performed in the second wireless communication device 2 according to the second embodiment of the present invention. The handover processing shown in FIG. 9 is performed by the control unit 20 and the other units of the second wireless communication device 2 working together.

Steps S61-S70 are the same as Steps S21-S30 in the first embodiment shown in FIG. 7, and hence description thereof is omitted.

After Step S70 by when the communication with the first wireless communication device 1 is handed over from the fourth wireless unit 25 to the third wireless unit 24, the control unit 20 reads the first connection available time from the storage unit 21, and sends the first connection available time from the third wireless unit S24 to the first wireless communication device 1 (Step S71).

Steps S72-S79 are the same as Steps S31-S38 in the first embodiment shown in FIG. 7 except that the first disconnection information at Step S73 is sent when the data sending processing, by which the preset data to be sent from the first wireless communication device 1 to the second wireless communication device 2 is sent, is completed or when the first connection available time is exceeded by the measured time, and hence description thereof is omitted.

In the second embodiment, the first connection available time is sent from the second wireless communication device 2 to the first wireless communication device 1, and the first wireless communication device 1 measures the first connection available time, but there is no limitation thereon. For example, the first connection available time may be sent from the first wireless communication device 1 to the second wireless communication device 2, and the second wireless communication device 2 may measure the first connection available time. So long as the first connection available time is sent from one wireless communication device to the other wireless communication device, and the other wireless communication device which receives the first connection available time measures the first connection available time, there is no limitation thereon.

As described above, by the wireless communication system A according to the second embodiment of the present invention, the advantageous effects same as those obtained by the wireless communication system A according to the first embodiment can be obtained. In addition, by the wireless communication system A according to the second embodiment of the present invention, the second wireless communication device 2 can be reconnected with the terminal device 3 when the first wireless communication device 1 receives the first connection available time from the second wireless communication device 2, with which the first wireless communication device 1 communicates by the wireless LAN communication, and the measured time by the first wireless communication device 1 exceeds the first connection available time.

That is, a time (first connection available time) during which the second wireless communication device 2 can communicate with the first wireless communication device 1 is measured by the first wireless communication device 1 which is a party for the second wireless communication device 2 in the wireless LAN communication, and consequently, the second wireless communication device 2 can be reconnected with the terminal device 3 while the first wireless communication device 1 recognizes the first connection available time of the second wireless communication device 2.

Third Embodiment

First, a configuration of the wireless communication system A according to a third embodiment of the present invention is described.

A schematic configuration of the wireless communication system A according to the third embodiment is the same as that of the wireless communication system A according to the first embodiment shown in FIG. 1, and hence illustration and description thereof are omitted.

A schematic configuration of the first wireless communication device 1 according to the third embodiment is similar to that of the first wireless communication device 1 according to the first embodiment, and hence illustration thereof is omitted, and only the difference therefrom is described.

The control unit 10 in the third embodiment performs handover processing which is similar to that performed by the control unit 10 in the first embodiment. In the handover processing in the third embodiment, the control unit 10 starts measuring a second connection available time after handing over the communication with the second wireless communication device 2 from the second wireless unit 15 to the first wireless unit 14. When the first wireless unit 14 performs the wireless LAN communication with the second wireless communication device 2, and the second connection available time is over, the control unit 10 determines that the prescribed processing is completed. Then, the control unit 10 sends the first disconnection information from the first wireless unit 14 to the second wireless communication device 2 so as to disconnect the second wireless communication device 2 from the first wireless unit 14.

The second connection available time is a preset time during which the first wireless unit 14 can perform the wireless LAN communication with the second wireless communication device 2, and stored in the storage unit 11 beforehand.

A schematic configuration of the second wireless communication device 2 according to the third embodiment is similar to that of the second wireless communication device 2 according to the first embodiment, and hence illustration thereof is omitted, and only the difference therefrom is described.

The control unit 20 in the third embodiment performs handover processing which is similar to that performed by the control unit 20 in the first embodiment. The first disconnection information in the third embodiment is received when the data sending processing, by which the preset data to be sent from the first wireless communication device 1 to the second wireless communication device 2 is sent, is completed or when the first connection available time is exceeded by the measured time.

Figure 10:
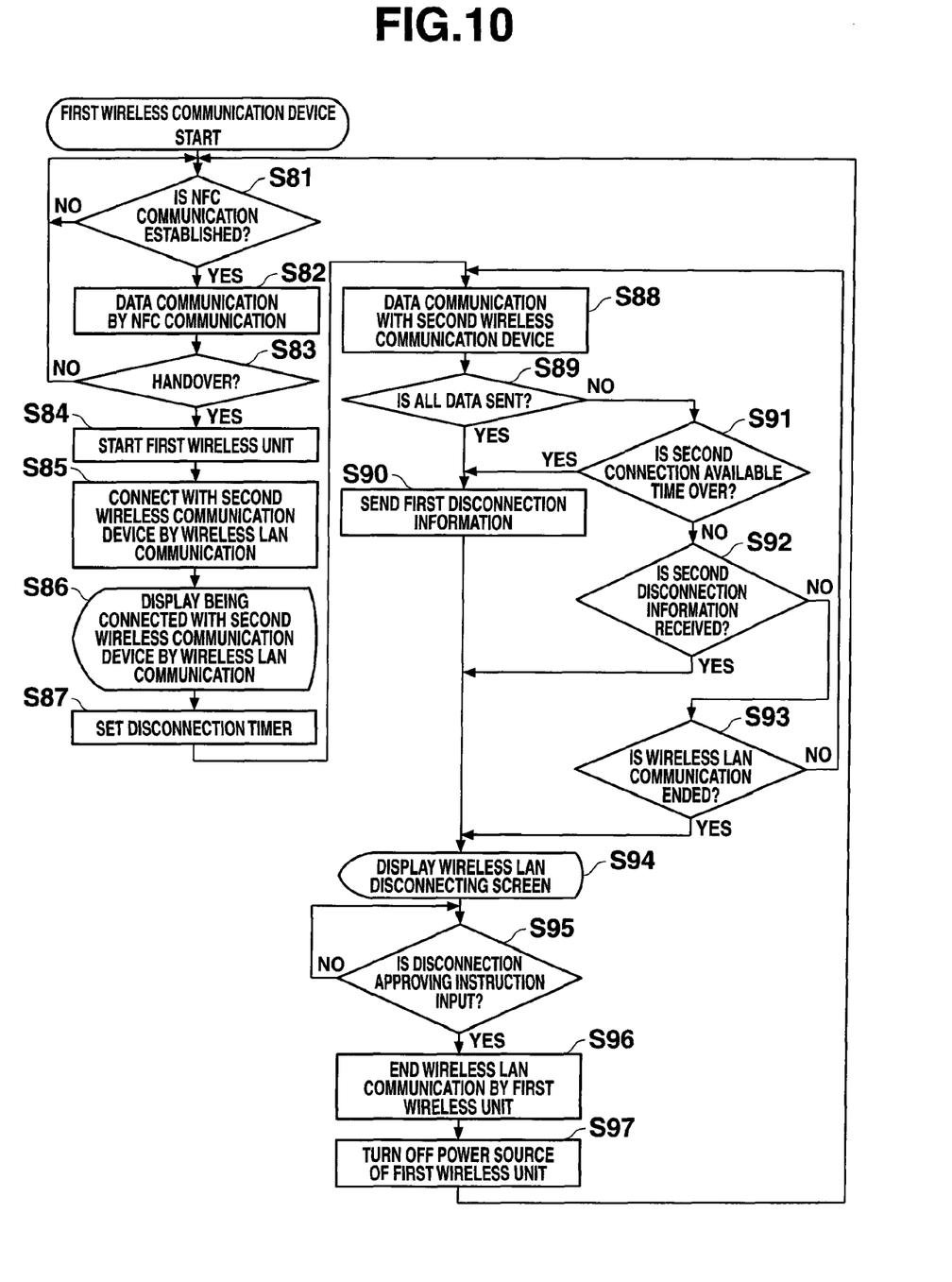
FIG. 10 is a flow chart of the handover processing performed in the first wireless communication device according to a third embodiment of the present invention.

Next, operation of the wireless communication system A according to the third embodiment of the present invention is described referring to FIG. 10.

As an initial state of the handover processing shown in FIG. 10, the second wireless communication device 2 is connected with the terminal device 3 via the third wireless unit 24 by the wireless LAN communication, and accordingly the second wireless communication device 2 is on a network where the terminal device 3 is.

FIG. 10 shows a flow chart of the handover processing performed in the first wireless communication device 1 according to the third embodiment of the present invention. The handover processing shown in FIG. 10 is performed by the control unit 10 and the other units of the first wireless communication device 1 working together.

Steps S81-S86 are the same as Steps S1-S6 in the first embodiment shown in FIG. 6, and hence description thereof is omitted.

The control unit 10 reads the second connection available time from the storage unit 21, sets the second connection available time to a disconnection timer provided in the control unit 10, and starts measuring the second connection available time (starts the disconnection timer) (Step S87).

The control unit 10 allows the first wireless unit 14 to perform the data communication with the second wireless communication device 2 by the wireless LAN communication (Step S88).

The control unit 10 determines whether all the data to be sent to the second wireless communication device 2 is sent or not (Step S89). When all the data is sent to the second wireless communication device 2 (Step S89; YES), the control unit 10 sends the first disconnection information from the first wireless unit 14 to the second wireless communication device 2 by the wireless LAN communication (Step S90).

When all the data is not sent to the second wireless communication device 2 (Step S89; NO), the control unit 10 determines whether the measured time by the disconnection timer exceeds the second connection available time or not (Step S91). When the second connection available time is exceeded by the measured time (Step S91; YES), the control unit 10 goes to Step S90.

That is, the first disconnection information in the third embodiment is sent when all the data is sent to the second wireless communication device 2 (Step S89; YES) or when the second connection available time is exceeded by the measured time (Step S91; YES).

When the second connection available time is not exceeded by the measured time (Step S91; NO), the control unit 10 goes to Step S92. Steps S92-S97 are the same as Steps S10-S15 in the first embodiment shown in FIG. 6, and hence description thereof is omitted.

Steps of the handover processing performed in the second wireless communication device 2 in the third embodiment are the same as Steps S21-S38 in the first embodiment shown in FIG. 7 except that, in the third embodiment, the first disconnection information at Step S32 is sent when the data sending processing, by which the preset data to be sent from the first wireless communication device 1 to the second wireless communication device 2 is sent, is completed or when the first connection available time is exceeded by the measured time, and hence illustration and description thereof are omitted.

In the third embodiment, the first wireless communication device 1 measures the second connection available time, but there is no limitation thereon. For example, the second wireless communication device 2 may measure the second connection available time. So long as at least one of the wireless communication devices measures the second connection available time, there is no limitation thereon.

When the second connection available time is measured by both the first wireless communication device 1 and the second wireless communication device 2, times measured by the first wireless communication device 1 and the second wireless communication device 2 may be different from each other. In this case, the first disconnection information is sent to each of the first wireless communication device 1 and the second wireless communication device 2 when each of their measured times exceeds the second connection available time. The steps of the handover processing thereafter are performed based on the first disconnection information which is sent first.

As described above, by the wireless communication system A according to the third embodiment of the present invention, the advantageous effects same as those obtained by the wireless communication system A according to the first embodiment can be obtained. In addition, by the wireless communication system A according to the third embodiment of the present invention, the second wireless communication device 2 can be reconnected with the terminal device 3 when the measured time by the first wireless communication device 1 exceeds the second connection available time.

That is, a time (second connection available time) during which the first wireless communication device 1 can communicate with the second wireless communication device 2 is measured by the first wireless communication device 1 itself, and consequently, the second wireless communication device 2 can be reconnected with the terminal device 3 depending on the second connection available time of the first wireless communication device 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication system comprising:
   a terminal device on a network;
   a first wireless communication device on the network; and
   a second wireless communication device on the network,
   wherein the first wireless communication device including:
      a first wireless unit to perform wireless communication with one of the terminal device and the second wireless communication device;
      a second wireless unit to perform short-range wireless communication with the second wireless communication device; and
      a first control unit to send first disconnection information for disconnecting the second wireless communication device to the second wireless communication device via the first wireless unit, and to disconnect the second wireless communication device from the first wireless unit when communication with the second wireless communication device is handed over from the short-range wireless communication performed by the second wireless unit to the wireless communication performed by the first wireless unit and prescribed processing to the second wireless communication device is completed, and wherein the second wireless communication device including:
  a third wireless unit to perform wireless communication with one of the terminal device and the first wireless communication device;
  a fourth wireless unit to perform short-range wireless communication with the first wireless communication device;
  a storage unit to store connection information for connecting with the terminal device; and
  a second control unit to allow the fourth wireless unit to hand over communication with the first wireless communication device to the third wireless unit after allowing the storage unit to store the connection information for connecting with the terminal device with which the third wireless unit is connected when the communication with the first wireless communication device is handed over from the short-range wireless communication performed by the fourth wireless unit to the wireless communication performed by the third wireless unit and the third wireless unit is connected with the terminal device, and to disconnect the first wireless communication device from the third wireless unit and connect the third wireless unit with the terminal device based on the connection information stored in the storage unit when the third wireless unit receives the first disconnection information while performing the communication with the first wireless communication device by the wireless LAN communication.

2. The wireless communication system according to claim 1, wherein the prescribed processing is data sending processing by which preset data to be sent to the second wireless communication device is sent.

3. The wireless communication system according to claim 1, wherein
  the second control unit sends first connection available time set in advance, during which the third wireless unit is connected with the first wireless communication device, to the first wireless communication device via the third wireless unit after the communication with the first wireless communication device is handed over from the fourth wireless unit to the third wireless unit; and
  the first control unit starts measuring the first connection available time when the first wireless unit receives the first connection available time from the second wireless communication device, and determines that the prescribed processing is completed when the first connection available time is over while the communication with the second wireless communication device is performed by the first wireless unit.

4. The wireless communication system according to claim 1, wherein the first control unit starts measuring a second connection available time set in advance, during which the first wireless unit is connected with the second wireless communication device, after the communication with the second wireless communication device is handed over from the second wireless unit to the first wireless unit, and determines that the prescribed processing is completed when the second connection available time is over while the communication with the second wireless communication device is performed by the first wireless unit.

5. The wireless communication system according to claim 1, wherein
  the second control unit sends second disconnection information for disconnecting the first wireless communication device to the first wireless communication device via the third wireless unit when the third wireless unit does not receive the first disconnection information from the first wireless communication device and a problem occurs to the communication with the first wireless communication device; and
  the first control unit disconnects the second wireless communication device from the first wireless unit when the prescribed processing to the second wireless communication device is not completed and the first wireless unit receives the second disconnection information from the second wireless communication device.

6. The wireless communication system according to claim 5, wherein the second control unit allows the fourth wireless unit to keep the short-range wireless communication with the first wireless communication device performed by the fourth wireless unit when the communication with the first wireless communication device is handed over from the fourth wireless unit to the third wireless unit, and determines that the problem occurs to the communication with the first wireless communication device when the short-range wireless communication with the first wireless communication device performed by the fourth wireless unit is ended.

7. The wireless communication system according to claim 5, wherein the second control unit determines that the problem occurs to the communication with the first wireless communication device when the wireless communication with the first wireless communication device performed by the third wireless unit is ended.

8. The wireless communication system according to claim 1, wherein the first wireless communication device further includes:
  a first display unit to display first disconnection notifying information for notifying that the second wireless communication device is to be disconnected from the first wireless unit; and
  a first input unit to receive input of a disconnection approving instruction for approving that the second wireless communication device is to be disconnected from the first wireless unit, and wherein the first control unit allows the first display unit to display the first disconnection notifying information when the second wireless communication device is to be disconnected from the firth wireless unit, and disconnects the second wireless communication device from the first wireless unit when the disconnection approving instruction is input from the first input unit.

9. The wireless communication system according to claim 1, wherein the second wireless communication device further includes:
  a second display unit to display second disconnection notifying information for notifying that the first wireless communication device is disconnected from the third wireless unit; and
  a second input unit to receive input of a disconnection confirming instruction for confirming that the first wireless communication device is disconnected from the third wireless unit, and
wherein the second control unit allows the second display unit to display the second disconnection notifying information when the first wireless communication device is disconnected from the third wireless unit, and connects the third wireless unit with the terminal device based on the connection information stored in the storage unit when the disconnection confirming instruction is input from the second input unit.

* * * * *